United States Patent
Louwet et al.

(10) Patent No.: US 7,674,843 B2
(45) Date of Patent: *Mar. 9, 2010

(54) STABLE PIGMENT DISPERSIONS

(75) Inventors: Frank Louwet, Diepenbeek (BE); Geert Deroover, Lier (BE); Bert Groenendaal, Sinaai (BE); Markus Hartenstein, Leimersheim (DE); Joachim Storsberg, Woerrstadt (DE)

(73) Assignee: Agfa Graphics NV, Mortsel (BE)

(*) Notice: Subject to any disclaimer, the term of this patent is extended or adjusted under 35 U.S.C. 154(b) by 264 days.

This patent is subject to a terminal disclaimer.

(21) Appl. No.: 11/815,473

(22) PCT Filed: Jan. 26, 2006

(86) PCT No.: PCT/EP2006/050453

§ 371 (c)(1),
(2), (4) Date: Aug. 3, 2007

(87) PCT Pub. No.: WO2006/082158

PCT Pub. Date: Aug. 10, 2006

(65) Prior Publication Data

US 2008/0167411 A1    Jul. 10, 2008

Related U.S. Application Data

(60) Provisional application No. 60/653,760, filed on Feb. 17, 2005.

(30) Foreign Application Priority Data

Feb. 4, 2005 (EP) .................... 05100784

(51) Int. Cl.
*C08F 2/00* (2006.01)
*C08L 31/00* (2006.01)
*C08L 41/00* (2006.01)

(52) U.S. Cl. .................... 523/160; 106/31.6; 106/31.85; 428/500; 523/161; 524/547; 524/548; 524/553; 524/555; 524/556; 524/558; 526/214; 526/222; 526/240; 526/266; 526/280; 526/287; 526/288; 526/312; 526/317.1; 526/318.1; 526/318.2; 526/318.3

(58) Field of Classification Search ............ 106/31.6, 106/31.85; 428/500; 523/160, 161; 524/547, 524/548, 553, 555, 556, 558; 526/214, 222, 526/240, 266, 280, 287, 288, 312, 317.1, 526/318.1, 318.2, 318.3
See application file for complete search history.

(56) References Cited

U.S. PATENT DOCUMENTS

| | | | |
|---|---|---|---|
| 5,859,113 A | 1/1999 | McIntyre et al. | |
| 6,051,645 A | 4/2000 | Suzuki et al. | |
| 6,306,994 B1 * | 10/2001 | Donald et al. | 526/317.1 |
| 6,413,306 B1 | 7/2002 | Kraiter et al. | |
| 6,652,634 B1 | 11/2003 | Akers, Jr. et al. | |
| 6,855,840 B2 * | 2/2005 | McCormick et al. | 558/230 |
| 2003/0177943 A1 | 9/2003 | Auweter et al. | |
| 2004/0014872 A1 | 1/2004 | Raether | |
| 2004/0102541 A1 | 5/2004 | Sacoto et al. | |
| 2004/0143032 A1 | 7/2004 | Auschra et al. | |
| 2004/0194800 A1 * | 10/2004 | Chang et al. | 134/2 |
| 2006/0100306 A1 * | 5/2006 | Yau et al. | 523/160 |
| 2006/0100307 A1 * | 5/2006 | Uerz et al. | 523/160 |

FOREIGN PATENT DOCUMENTS

| | | |
|---|---|---|
| CA | 2 157 361 C | 9/1994 |
| EP | 1 182 218 A1 | 2/2002 |
| EP | 0 996 689 B1 | 12/2002 |
| WO | WO 98/01478 * | 1/1998 |
| WO | 03/066685 A2 | 8/2003 |
| WO | 2004/067287 A1 | 8/2004 |

OTHER PUBLICATIONS

Mitsukami et al, "Water Soluble Polymers. 81. Direct Synthesis of Hydrophilic Styrene-Based Homopolymers and Block Copolymers in Aqueous Solution via RAFT", Macromolecules, 34: 2248-2256 (2001).*
Official Communication for PCT Application No. PCT/EP2006/050453; mailed on May 8, 2006.
Spinelli, "Polymeric Dispersants in Ink Jet Technology," Advanced Materials. 1998, vol. 10, No. 15, p. 1215-1218.
Spinelli, "GTP and Its Use in Water Based Pigment Dispersants and Emulsion Stabilizers," Proc. of 20th Int. Conf. Org. Coat Sci. Technol.. New Platz, N.Y.: State Univ. N.Y., Inst. Mater. Sci. p. 511-518.
Louwet Frank et al.; "Stable Pigment Dispersions"; U.S. Appl. No. 11/815,481, filed Aug. 3, 2007.
Bert Groenendaal et al.; "Novel Polymeric Dispersant"; U.S. Appl. No. 11/815,471, filed Aug. 3, 2007.
Wei, Liuhe et al.; "Study on Self-Assembly of Polystyrene-b-Polyvinylbenzoic Acid in Ethanol;" Acta Polymerica Sinica, pp. 548-551, Aug 2002.

* cited by examiner

*Primary Examiner*—David Wu
*Assistant Examiner*—Marie Reddick
(74) *Attorney, Agent, or Firm*—Keating & Bennett, LLP

(57) ABSTRACT

A pigment dispersion includes a pigment with at least one carboxylic acid group and a block copolymer including aromatic monomers having at least one carboxylic acid group or a salt thereof and aromatic monomers having at least one sulfonic acid group or a salt thereof. The pigment dispersions can be used for manufacturing inkjet inks and for the coating of colored layers.

21 Claims, No Drawings

STABLE PIGMENT DISPERSIONS

CROSS-REFERENCE TO RELATED APPLICATIONS

This application is a 371 of PCT/EP2006/050453, filed Jan. 26, 2006. This application claims the benefit of U.S. Provisional Application No. 60/653,760, filed Feb. 17, 2005 which is incorporated by reference. In addition, this application claims the benefit of European Application No. 05100784.7, filed Feb. 4, 2005, which is also incorporated by reference.

BACKGROUND OF THE INVENTION

1. Field of the Invention

The present invention relates to stable pigment dispersions and to their use in colored layers, inkjet inks, and printing inks.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic, or non-ionic structure. The presence of a dispersant substantially reduces the dispersing energy required. Dispersed pigment particles may have a tendency to re-agglomerate after the dispersing operation, due to mutual attraction forces. The use of dispersants also counteracts the re-agglomeration tendency of the pigment particles.

The dispersant has to meet particularly high requirements when used for dispersing pigments. Inadequate dispersing manifests itself as increased viscosity in liquid systems, loss of brilliance, and hue shifts. Particularly good dispersion of the pigment particles is required in the case of inks for use in inkjet printers so as to ensure unimpeded passage of the pigment particles through the nozzles of the print head which are usually only a few micrometers in diameter. In addition, pigment particle agglomeration and the associated blockage of the printer nozzles has to be avoided in the standby periods of the printer.

Polymeric dispersants contain in one part of the molecule so-called anchor groups, which adsorb onto the pigments to be dispersed. In a spatially separate part of the molecule, polymeric dispersants have a polymer chain which sticks out and whereby pigment particles are made compatible with the dispersion medium, i.e., stabilized.

The properties of polymeric dispersants depend on both the nature of the monomers and their distribution in the polymer. Polymeric dispersants obtained by randomly polymerizing monomers (e.g., monomers A and B polymerized into ABBAABAB) or by polymerizing alternating monomers (e.g., monomers A and B polymerized into ABABABAB) generally result in a poor dispersion stability. Improvements in dispersion stability have been obtained using graft copolymer and block copolymer dispersants.

Graft copolymer dispersants consist of a polymeric backbone with side chains attached to the backbone. CA 2157361 (DU PONT) discloses pigment dispersions made by using a graft copolymer dispersant with a hydrophobic polymeric backbone and hydrophilic side chains. Other graft copolymer dispersants are disclosed in U.S. Pat. No. 6,652,634 (LEXMARK), EP 1182218 A (DU PONT), and U.S. 2004/0102541 (LEXMARK).

Block copolymer dispersants having hydrophobic and hydrophilic blocks have also been disclosed. EP 996689 A (DU PONT) discloses an AB block copolymer dispersant with a polymeric A segment of polymerized glycidyl(meth)acrylate monomers reacted with an aromatic or aliphatic carboxylic acid, and a polymeric B segment of polymerized alkyl(meth)acrylate monomers or hydroxyalkyl(meth)acrylate monomers. U.S. Pat. No. 6,413,306 (DU PONT) discloses ABC block copolymer dispersants with a polymeric A segment of polymerized alkyl(meth)acrylate, aryl(meth)acrylate or cyclo alkyl(meth)acrylate, a polymeric B segment of polymerized alkyl amino alkyl(meth)acrylate monomers with a quaternized alkyl group, and a polymeric C segment of polymerized hydroxyalkyl(meth)acrylate monomers.

U.S. Pat. No. 5,859,113 (DU PONT) discloses a pigment dispersion useful for forming coating compositions containing dispersed pigment, a carrier liquid and an AB-block polymer dispersant (binder); the AB block polymer has a number average molecular weight of about 5,000-20,000 and contains 20-80% by weight of a polymeric A segment and correspondingly 80-20% by weight of a polymeric B segment; wherein the polymeric A segment of the block polymer is of polymerized glycidyl(meth)acrylate monomers reacted with an acid from the group of aromatic carboxylic acids or aliphatic carboxylic acids; and the B segment is of polymerized alkyl(meth)acrylate monomers having 1-12 carbon atoms in the alkyl group, hydroxy alkyl (meth)acrylate monomers having about 1-4 carbon atoms in the alkyl group; and wherein the weight ratio of pigment to binder in the dispersion is about 1/100-200/100.

The method of group transfer polymerization (GTP) used for synthesis of AB blockcopolymers is disclosed by SPINELLI, Harry J. GTP and its use in water based pigment dispersants and emulsion stabilizers, Proc. of 20th Int. Conf. Org. Coat. Sci. Technol., New Platz, N.Y.: State Univ. N.Y., Inst. Mater. Sci. pp. 511-518. Other techniques include atom transfer radical polymerization (ATRP), RAFT (reversible addition-fragmentation chain transfer polymerization), MADIX (reversible addition-fragmentation chain transfer process, using a transfer active xanthate), catalytic chain transfer (e.g., using cobalt complexes), or nitroxide (e.g., TEMPO) mediated polymerizations.

The design of polymeric dispersants for ink-jet inks is discussed in SPINELLI, Harry J., Polymeric Dispersants in Ink Jet Technology, *Advanced Materials*, 1998, vol. 10, no. 15, pp. 1215-1218.

A wide variety of polymeric dispersants has been proposed, but the dispersion stability of pigments, especially in inkjets, still needs further improvement.

SUMMARY OF THE INVENTION

In order to overcome the problems described above, preferred embodiments of the present invention provide pigment dispersions with a high dispersion stability and a high optical density.

Another preferred embodiment of the present invention provides inkjet inks with a high dispersion stability and producing images of high image quality with a high optical density.

Further preferred embodiments of the present invention provide a colored layer that can be manufactured with pigments at a low cost, i.e., high optical densities using low amounts of pigments.

Further advantages and preferred embodiments of the present invention will become apparent from the description hereinafter.

It has been surprisingly discovered that pigment dispersions with high stability and high optical density were obtained for pigments including one or more carboxylic acid groups using tailor-made block copolymers with blocks polymerized from two different ionic aromatic monomers.

Further preferred embodiments of the present invention have been achieved with a pigment dispersion including a pigment with at least one carboxylic acid group and a block copolymer including aromatic monomers having at least one carboxylic acid group or a salt thereof and aromatic monomers having at least one sulfonic acid group or a salt thereof.

Further advantages and preferred embodiments of the present invention will become apparent from the following description.

The pigment dispersions according to preferred embodiments of the present invention can be used in inks and ink sets for inkjet printing applications, but can also be used in imaging materials, e.g., photographic and photothermographic materials, to improve the image quality. The sharpness of the images produced with these materials can be improved by adding the pigment dispersion to the imaging layer or in a separate colored layer, i.e., an anti-halation layer. The optical density of an anti-halation layer is preferably at least about 0.5, since below an optical density of about 0.5 the anti-halation sharpness improves much more by the addition of a colorant.

Other features, elements, processes, steps, characteristics and advantages of the present invention will become more apparent from the following detailed description of preferred embodiments of the present invention.

DETAILED DESCRIPTION OF PREFERRED EMBODIMENTS

Definitions

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic coloring agent that is practically insoluble in the application medium under the pertaining ambient conditions, hence having a solubility of less than about 10 mg/L therein.

The term "dispersion", as used in disclosing the preferred embodiments of the present invention, means an intimate mixture of at least two substances, one of which, called the dispersed phase or colloid, is uniformly distributed in a finely divided state through the second substance, called the dispersion medium.

The term "dispersant", as used in disclosing the preferred embodiments of the present invention, means a substance for promoting the formation and stabilization of a dispersion of one substance in a dispersion medium.

The term "copolymer", as used in disclosing the preferred embodiments of the present invention, means a macromolecule in which two or more different species of monomers are incorporated into a polymer chain.

The term "block copolymer", as used in disclosing the preferred embodiments of the present invention, means a copolymer in which the monomers occur in relatively long alternate sequences in a chain.

The term "initiating radical", as used in disclosing the preferred embodiments of the present invention, means a free radical that is derived from the initiator.

The term "propagating radical", as used in disclosing the preferred embodiments of the present invention, means a radical that has added one or more monomers and is capable of adding further monomers.

The term "spectral separation factor" as used in disclosing the preferred embodiments of the present invention means the value obtained by calculating the ratio of the maximum absorbance $A_{max}$ (measured at wavelength $\lambda_{max}$) over the absorbance determined at the wavelength $\lambda_{max}$+200 nm.

The abbreviation "SSF" is used in disclosing the preferred embodiments of the present invention for spectral separation factor.

The abbreviation "SSA" is used in disclosing the preferred embodiments of the present invention for 4-styrene sulfonic acid.

The abbreviation "SSA-Na" is used in disclosing the preferred embodiments of the present invention for sodium 4-styrenesulfonate.

The abbreviation "VBA" is used in disclosing the preferred embodiments of the present invention for 4-vinyl benzoic acid.

The abbreviation "VBA-Na" is used in disclosing the preferred embodiments of the present invention for sodium 4-vinyl benzoate.

The term "alkyl" means all variants possible for each number of carbon atoms in the alkyl group, i.e., for three carbon atoms: n-propyl and isopropyl; for four carbon atoms: n-butyl, isobutyl, and tertiary-butyl; for five carbon atoms: n-pentyl, 1,1-dimethyl-propyl, 2,2-dimethylpropyl, and 2-methylbutyl etc.

The term "acyl group" means —(C═O)-aryl and —(C═O)-alkyl groups.

The term "aliphatic group" means saturated straight chain, branched chain, and alicyclic hydrocarbon groups.

The term "unsaturated aliphatic group" means straight chain, branched chain, and alicyclic hydrocarbon groups which contain at least one double or triple bond.

The term "aromatic group" as used in disclosing the preferred embodiments of the present invention means an assemblage of cyclic conjugated carbon atoms, which are characterized by large resonance energies, e.g., benzene, naphthalene, and anthracene.

The term "alicyclic hydrocarbon group" means an assemblage of cyclic carbon atoms, which do not form an aromatic group, e.g., cyclohexane.

The term "substituted" as used in disclosing the preferred embodiments of the present invention means that one or more of the carbon atoms and/or that a hydrogen atom of one or more of carbon atoms in an aliphatic group, an aromatic group, or an alicyclic hydrocarbon group, are replaced by an oxygen atom, a nitrogen atom, a halogen atom, a silicon atom, a sulphur atom, a phosphorous atom, selenium atom, or a tellurium atom. Such substituents include hydroxyl groups, ether groups, carboxylic acid groups, ester groups, amide groups, and amine groups.

The term "heteroaromatic group" means an aromatic group wherein at least one of the cyclic conjugated carbon atoms is replaced by a non-carbon atom such as a nitrogen atom, a sulphur atom, an oxygen atom, or a phosphorous atom.

The term "heterocyclic group" means an alicyclic hydrocarbon group wherein at least one of the cyclic conjugated carbon atoms is replaced by a non-carbon atom such as an oxygen atom, a nitrogen atom, a phosphorous atom, a silicon atom, a sulfur atom, a selenium atom, or a tellurium atom.

Pigment Dispersion

The pigment dispersion according to preferred embodiments of the present invention contains at least three components: (i) a pigment, (ii) a dispersant, and (iii) a dispersion medium.

The pigment dispersion according to preferred embodiments of the present invention may further contain at least one surfactant.

The pigment dispersion according to preferred embodiments of the present invention may further contain at least one biocide.

The pigment dispersion according to preferred embodiments of the present invention may further contain at least one pH adjuster.

Pigments

The pigment used in the pigment dispersion according to preferred embodiments of the present invention should be a pigment or a dye with at least one carboxylic acid group or a salt thereof.

The pigment can be black, cyan, magenta, yellow, red, orange, violet, blue, green, brown, mixtures thereof, and the like.

Suitable pigments for the color inks of the ink-jet ink set according to preferred embodiments of the present invention include: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C.I. Pigment Blue 15:3, C.I. Pigment Blue 15:4, C. I. Pigment Red 23, C. I. Pigment Red 112, C. I. Pigment Yellow 126, C. I. Pigment Red 169, C. I. Pigment Orange 13, C. I. Pigment Red 1-10, 12, C.I. Pigment Blue 1:X, C.I. Pigment Yellow 42, C.I. Pigment Red 101, C.I. Pigment Brown 6, C. I. Pigment Brown 7, C. I. Pigment Brown 7:X, C. I. Pigment Metal 1, C. I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C. I. Pigment Yellow 185, C.I. Pigment Yellow 180, C.I. Pigment Red 122, C.I. Pigment Red 184, bridged aluminium phthalocyanine pigments and solid solutions of pigments.

For the black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11. Additional examples of suitable pigments are disclosed in U.S. Pat. No. 5,389,133 (XEROX).

Further, the pigment may be chosen from those disclosed by HERBST, W. et al., Industrial Organic Pigments, Production, Properties, Applications, 2nd edition, vch, 1997.

Particular preferred pigments are C.I. Pigment Yellow 1, 3, 10, 12, 13, 14, 17, 65, 73, 74, 75, 83, 93, 109, 120, 128, 138, 139, 150, 151, 154, 155, 180, 185; C.I. Pigment Red 17, 22, 23, 57:1, 122, 144, 146, 170, 176, 184, 185, 188, 202, 206, 207, 210; C.I. Pigment Violet 19 and C.I. Pigment Violet 19; C.I. Pigment Blue 15:1, C.I. Pigment Blue 15:2, C.I. Pigment Blue 15:3, C.I. Pigment Blue 15:4, and C.I. Pigment Blue 16.

In a preferred embodiment, the color inks of the ink-jet ink set are prepared using the pigments C.I. Pigment Yellow 74, C.I. Pigment Red 122, and a β-Cu Phthalocyanine pigment.

The pigment particles in the pigment dispersion should be sufficiently small, e.g., to permit free flow of an ink-jet ink containing such pigment particles through the ink-jet printing device, especially at the ejecting nozzles. It is also desirable to use small particles for maximum color strength.

The average particle size of the pigment in the pigment dispersion should preferably be between about 0.005 µm and about 15 µm. Preferably, the average pigment particle size is between about 0.005 µm and about 5 µm, more preferably between about 0.005 µm and about 1 µm, and particularly preferably between about 0.005 µm and about 0.3 µm. Larger pigment particle sizes may be used as long as the objectives of the present invention are achieved.

The pigment is used in the pigment dispersion in an amount of 0.1 wt % to about 20 wt %, preferably about 1 wt % to about 10 wt % based on the total weight of the pigment dispersion.

Dispersant

The dispersant used in the pigment dispersion according to preferred embodiments of the present invention is a block copolymer including aromatic monomers having at least one carboxylic acid group or a salt thereof and aromatic monomers having at least one sulfonic acid group or a salt thereof. The block copolymer preferably contains at least about 25 monomers.

For a good stabilization of the pigment dispersion, it is preferred that the length of a block that adsorbs onto a pigment particle matches the size of the pigment particle.

The block copolymer can be any of AB, ABA, ABAB, ABABA, ABC, ABCBA . . . -type blockcopolymers, wherein A, B, and C represent blocks of the same species of monomer. The preferred blockcopolymer is an AB-type blockcopolymer.

The dispersant is used in the pigment dispersion in an amount of about 5 wt % to about 200 wt %, preferably about 10 wt % to about 100 wt % based on the weight of the pigment.

Aromatic Monomers

The aromatic monomers having at least one carboxylic acid group or a salt thereof and the aromatic monomers having at least one sulfonic acid group or a salt thereof are represented by Formula (I):

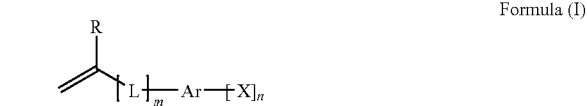

Formula (I)

wherein, m=0 or 1;

n is 1 or an integer value greater than 1;

R represents hydrogen or methyl;

L represents a linking group containing at least one atom selected from the group consisting of C, O, and S;

Ar represents an aromatic group or a heteroaromatic group;

X is selected from the group consisting of COOH, COO$^-$M$^+$, SO$_3$H, and SO$_3{}^-$M$^+$; and M$^+$ represents a cation.

Preferably, the linking group L is represented by —(C=O)—O—.

Preferably M+ is selected from the group consisting of Na+, Li+, K+, NH4+, and quaternary amine.

Suitable aromatic monomers according to Formula (I) having at least one carboxylic acid group or a salt thereof include:

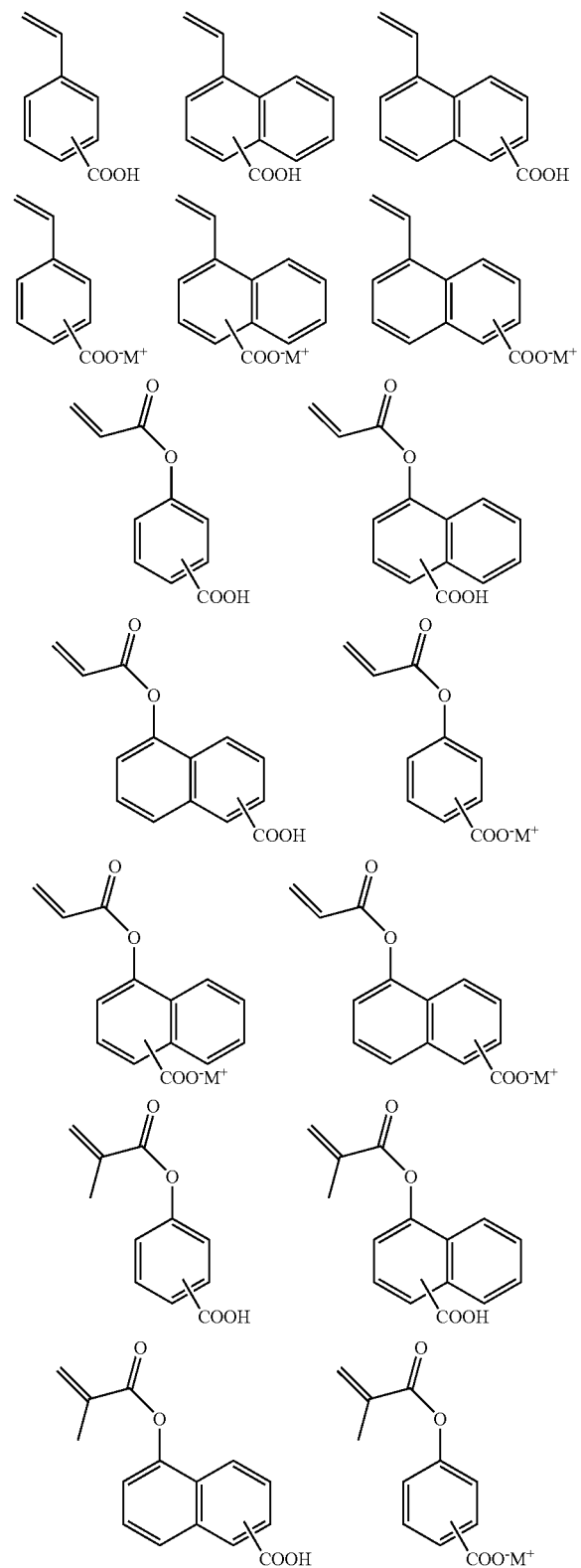

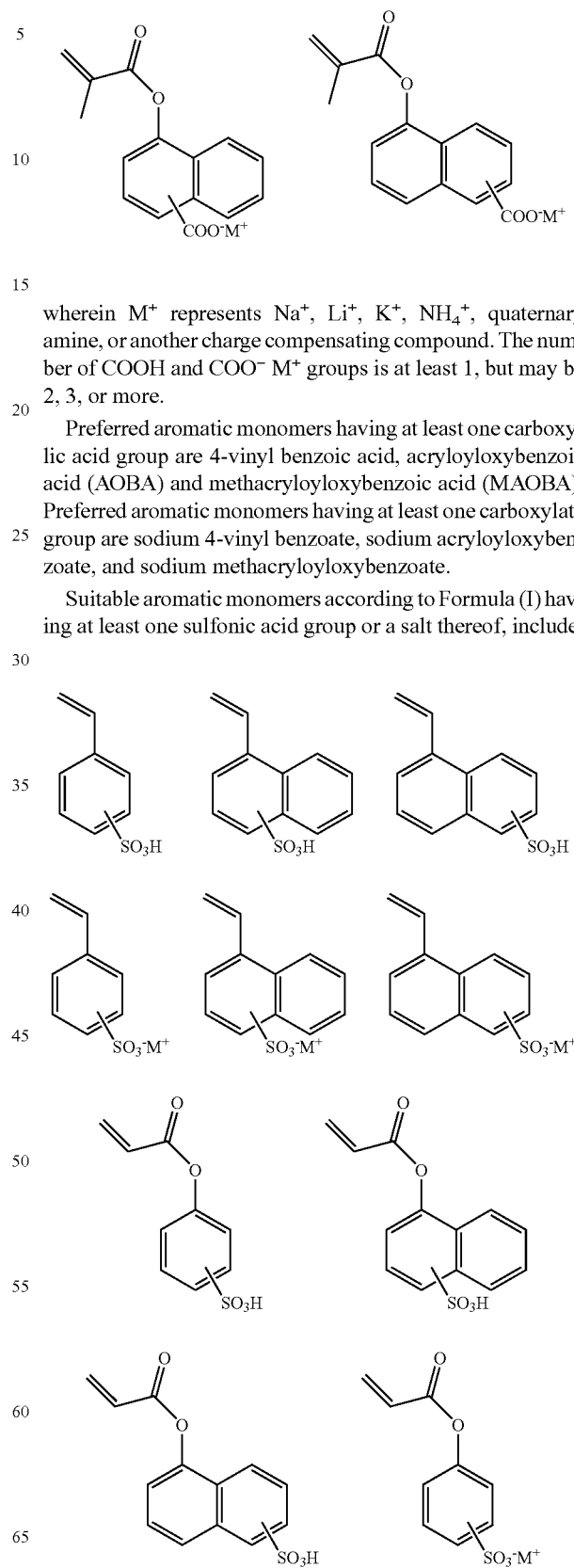

wherein M+ represents Na+, Li+, K+, NH4+, quaternary amine, or another charge compensating compound. The number of COOH and COO− M+ groups is at least 1, but may be 2, 3, or more.

Preferred aromatic monomers having at least one carboxylic acid group are 4-vinyl benzoic acid, acryloyloxybenzoic acid (AOBA) and methacryloyloxybenzoic acid (MAOBA). Preferred aromatic monomers having at least one carboxylate group are sodium 4-vinyl benzoate, sodium acryloyloxybenzoate, and sodium methacryloyloxybenzoate.

Suitable aromatic monomers according to Formula (I) having at least one sulfonic acid group or a salt thereof, include:

-continued

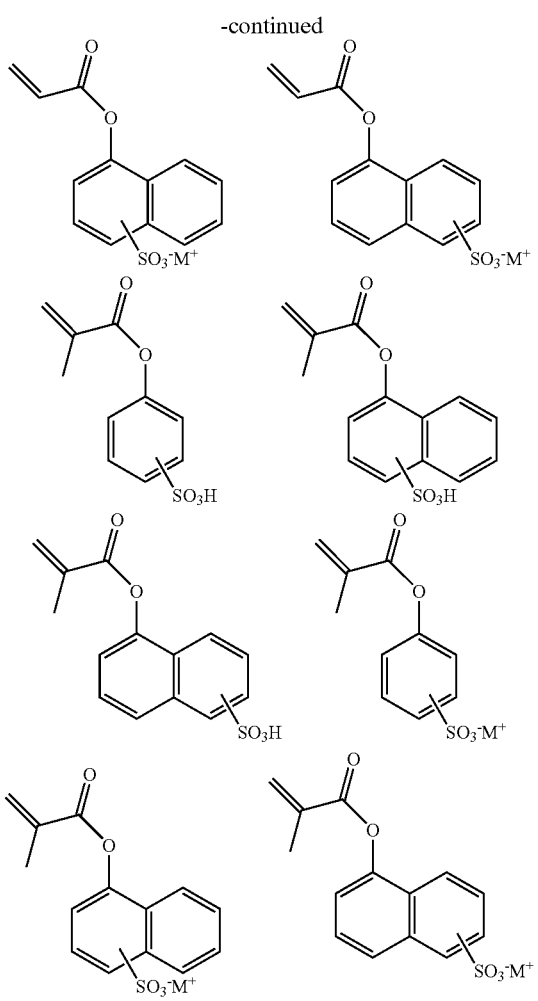

wherein M+ represents Na+, Li+, K+, NH4+, quaternary amines, and other charge compensating compounds. The number of SO3H and SO3−M+ groups is at least 1, but may be 2, 3, or more.

A preferred aromatic monomer having at least one sulfonic acid group is 4-styrene sulfonic acid. A preferred aromatic monomer having at least one sulfonate group is sodium 4-styrenesulfonate.

Other Monomers and Oligomers

The block copolymer may contain monomers and/or oligomers other than the aromatic monomers of the preferred embodiments of the present invention. The monomers and/or oligomers used in possible other segments of the block copolymer according to preferred embodiments of the present invention can be any monomer and/or oligomer found in Polymer Handbook, Vol. 1 +2, 4th edition, Edited by J. BRANDRUP, et al., Wiley-Interscience, 1999.

Suitable examples of monomers include: acrylic acid, methacrylic acid, maleic acid (or their salts), maleic anhydride; alkyl(meth)acrylates (linear, branched and cycloalkyl) such as methyl(meth)acrylate, n-butyl(meth)acrylate, tert-butyl(meth)acrylate, cyclohexyl(meth)acrylate and 2-ethylhexyl(meth)acrylate; aryl(meth)acrylates such as benzyl (meth)acrylate and phenyl(meth)acrylate; hydroxyalkyl (meth)acrylates such as hydroxyethyl(meth)acrylate and hydroxypropyl(meth)acrylate; (meth)acrylates with other types of functionalities (e.g., oxirane, amino, fluoro, polyethylene oxide, phosphate-substituted) such as glycidyl (meth) acrylate, dimethylaminoethyl(meth)acrylate, trifluoroethyl acrylate, methoxypolyethyleneglycol (meth)acrylate and tripropyleneglycol(meth)acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl(meth)acrylamide; maleimides such as N-phenyl maleimide, N-benzyl maleimide and N-ethyl maleimide; vinyl derivatives such as vinylcaprolactam, vinylpyrrolidone, vinylimidazole, vinylnaphthalene and vinyl halides; vinylethers such as vinylmethyl ether; and vinylesters of carboxylic acids such as vinylacetate and vinylbutyrate.

Synthesis of Dispersant

The block copolymers used in the pigment dispersion according to preferred embodiments of the present invention can be prepared with any suitable method for polymerizing monomers to block copolymers.

In a preferred embodiment, the block copolymer used in the pigment dispersion is prepared by reversible addition fragmentation chain transfer polymerization (RAFT). RAFT polymerization has been disclosed in detail in patents WO 98/01478 (DU PONT), U.S. 2004/0024132 (DU PONT), WO 01/77198 (DU PONT), and U.S. Pat. No. 6,642,318 (DU PONT).

Controlled polymerization by RAFT occurs via rapid chain transfer between growing polymer radicals and dormant polymer chains. After initiation, the control agent CTA becomes part of the dormant polymer chain. The key to successful RAFT polymerizations, for producing polymers of controlled molecular weight and low polydispersity, is the presence of a highly efficient dithioester chain transfer agent (CTA), also called RAFT agent. The RAFT agent reacts with either the initiating radical (derived from the initiator) or with the propagating radical, forming a new CTA and eliminating a radical R*, which reinitiates the polymerization. In theory, propagation will continue until no monomer is left and a termination step occurs. After the first polymerization has finished, a second monomer can be added to the system to form a block copolymer.

The source of initiating radicals can be any suitable method of generating free radicals such as those disclosed in the patents WO 98/01478 (DU PONT), U.S. 2004/0024132 (DU PONT), WO 01/77198 (DU PONT), and U.S. Pat. No. 6,642,318 (DU PONT).

The RAFT agent can be any dithioester chain transfer agent disclosed in the patents WO 98/01478 (DU PONT), U.S. 2004/0024132 (DU PONT), WO 01/77198 (DU PONT), and U.S. Pat. No. 6,642,318 (DU PONT).

In a preferred embodiment for preparing the dispersant, the RAFT polymerization is performed in an aqueous medium with a water soluble RAFT agent.

A preferred water soluble RAFT agent is 4-cyanopentanoic acid dithiobenzoate.

The synthesis of 4-cyanopentanoic acid dithiobenzoate is a multi-step procedure involving the synthesis of dithiobenzoic acid (DTBA), which subsequently is oxidized to di(thiobenzoyl) disulfide, before final reaction with 4,4'-azobis (4-cyano-pentanoic acid) to yield 4-cyanopentanoic acid dithiobenzoate.

FIG. 1 Synthesis Scheme of 4-cyanopentanoic Acid Dithiobenzoate.

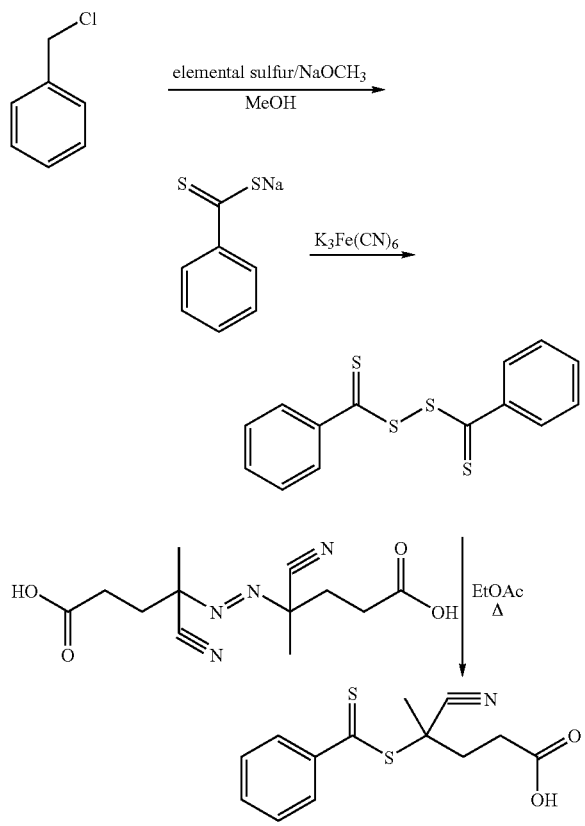

In another preferred embodiment, the block copolymer used in the pigment dispersion according to preferred embodiments of the present invention is prepared by a reversible addition-fragmentation chain transfer process using a transfer active xanthate (MADIX). This process for macromolecular design via interchange of xanthates is described in more detail by WO 98/58974 (RHODIA).

Dispersion Medium

The dispersion medium used in the pigment dispersion according to preferred embodiments of the present invention is a liquid. The dispersion medium may include water and/or organic solvent(s). Preferably, the dispersion medium is water.

If the pigment dispersion is used to manufacture radiation curable inkjet inks, water and/or organic solvent(s) are replaced by one or more monomers and/or oligomers to obtain a liquid dispersion medium. Sometimes, it can be advantageous to add a small amount of an organic solvent to improve the dissolution of the dispersant. The content of organic solvent should be lower than about 20 wt % based on the total weight of the pigment dispersion.

Suitable organic solvents include alcohols, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Surfactant

The pigment dispersion according to preferred embodiments of the present invention may contain at least one surfactant. The surfactant(s) can be anionic, cationic, non-ionic, or zwitter-ionic and are usually added in a total quantity less than about 20 wt % based on the total weight of the pigment dispersion and particularly in a total less than about 10 wt % based on the total weight of the pigment dispersion.

Suitable surfactants for the pigment dispersion according to preferred embodiments of the present invention include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Biocide

Suitable biocides for the pigment dispersion of preferred embodiments of the present invention include sodium dehydroacetate, 2-phenoxyethanol, sodium benzoate, sodium pyridinethion-1-oxide, ethyl p-hydroxybenzoate, and 1,2-benzisothiazolin-3-one and salts thereof.

A preferred biocide is BRONIDOX™ available from HENKEL.

A biocide is preferably added in an amount of about 0.001 wt. % to about 3 wt. %, more preferably about 0.01 wt. % to about 1.00 wt. %, each based on the total weight of the pigment dispersion.

pH Adjuster

The pigment dispersion according to preferred embodiments of the present invention may contain at least one pH adjuster. Suitable pH adjusters include NaOH, KOH, NEt$_3$, NH$_3$, HCl, HNO$_3$, and H$_2$SO$_4$. Preferred pH adjusters used in the preparation of a precipitation dispersion are NaOH and H$_2$SO$_4$.

Preparation of a Pigment Dispersion

The pigment dispersion according to preferred embodiments of the present invention may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

In a preferred embodiment, the pigment dispersion is a precipitation dispersion, wherein the pigment with at least one carboxylic acid group is first solubilized in the dispersion medium by increasing the pH above 9 and subsequently precipitating the solubilized pigment in the presence of the dispersant by addition of an acid.

Very fine dispersions of pigments and methods for their preparation are disclosed in, e.g., EP 776952 A (KODAK), U.S. Pat. No. 5,538,548 (BROTHER), U.S. Pat. No. 5,443,628 (VIDEOJET SYSTEMS), EP 259130 A (OLIVETTI), U.S. Pat. No. 5,285,064 (EXTREL), EP 429828 A (CANON), and EP 526198 A (XEROX).

Spectral Separation Factor

The spectral separation factor SSF was found to be an excellent measure to characterize an ink-jet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication of the shape of the absorption spectrum. The dispersion quality can be evaluated based on the phenomenon of light scattering induced by solid particles in solutions. Light scattering in pigment inks may be detected as an increased absorbance at higher wavelengths than the absorbance peak of the actual pigment. The dispersion stability can be evaluated by comparing the SSF before and after a heat treatment of, e.g., 4 hours at 60° C. or a week at 80° C.

The spectral separation factor SSF of the ink is calculated by using the data of the recorded spectrum of an ink solution or a jetted image on a substrate and comparing the maximum absorbance to the absorbance at a reference wavelength. The spectral separation factor is calculated as the ratio of the maximum absorbance $A_{max}$ over the absorbance $A_{ref}$ at the reference wavelength.

$$SSF = \frac{A_{max}}{A_{ref}}$$

The SSF is an excellent tool to design ink-jet ink sets with large color gamut. Often, ink-jet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that an ink might be absorbing in the range of another ink. The resulting color gamut of these ink-jet ink sets is low or mediocre.

EXAMPLES

Materials

All materials used in the following examples were readily available from standard sources such as Aldrich Chemical Co. (Belgium) and Acros (Belgium) unless otherwise specified.

The water used was deionized water.
AIBN is 2,2'-azobis(isobutyronitrile) from Acros.
AIBNCOOH is from Aldrich.
Vinyl benzoic acid is from UBICHEM Ltd.
Sodium 4-styrenesulfonate is from Acros.
MARLON™ A365 is from Hüls AG.
ARLO is a 10% aqueous solution of Marlon A365.
KPF16353 is Ca-free medium viscosity gelatin from Koepff.
Transparent 150 μm subbed PET is available as P100C S/S AS from AGFA-GEVAERT.
The pigments used were DYE-1 and DYE-2:

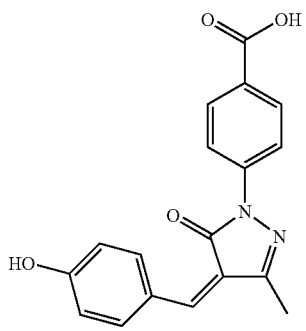

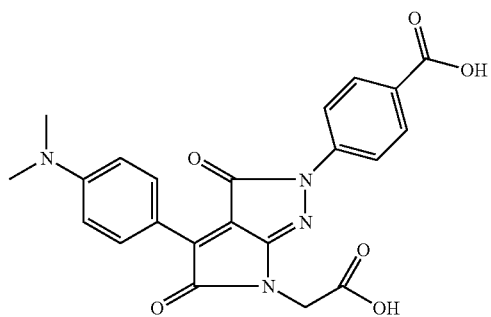

The blockcopolymers in Table 1 represent the general formulas of the dispersants used in Example 2, 3, and 4.

TABLE 1

| Blockcopolymer | Chemical structure |
|---|---|
| BCP-1 | |
| BCP-2 | |
| BCP-3 | |
| BCP-4 | |

TABLE 1-continued

| Blockcopolymer | Chemical structure |
| --- | --- |
| BCP-5 | (structure with O, x, y, phenyl group) |
| BCP-6 | (structure with x, y, z segments; HO–C=O groups and phenyl) |
| BCP-7 | (structure with x, y, z segments; HO–C=O and two phenyl groups) |
| BCP-8 | (structure with x, y segments; phenyl-SO$_3$Na and phenyl-C(=O)OH groups) |

Measurement Methods

1. SSF Factor

The spectral separation factor SSF characterizes the light absorption by pigment dispersions. It takes into account the shape of the absorption spectrum and absorbance-value at $\lambda_{max}$ of a coated layer. Efficient pigment dispersions exhibiting a narrow absorption spectrum and a high maximum absorbance have a value for SSF of at least about 30.0 for coated layers of the pigment dispersions.

The spectral separation factor SSF was calculated as the ratio of the maximum absorbance $A_{max}$ (measured at wavelength $\lambda_{max}$) over the absorbance determined at the wavelength $\lambda_{max}+200$ nm.

The absorbance was determined in transmission on the coated layer with a Hewlett Packard 8452A Diode Array spectrophotometer.

2. Dispersion Stability

The dispersion stability was evaluated by comparing the SSF before and after a heat treatment of 4 hours at 60° C. Pigment dispersions exhibiting good dispersion stability have a SSF after heat treatment still larger than about 30.0 and preferably a % reduction in SSF smaller than about 30%.

3. Polymer Analysis

All polymers have been characterized with gel permeation chromatography (GPC) and nuclear magnetic resonance spectroscopy (NMR). Random or block copolymers were analyzed with NMR by dissolving them in a deuterated solvent. For $^1$H-NMR ±20 mg polymer was dissolved in 0.8 mL CDCl$_3$ or DMSO-d6 or acetonitrile-d3 or D$_2$O (with or without NaOD addition). Spectra were recorded on a Varian Inova 400 MHz instrument equipped with an ID-probe. For $^{13}$C-NMR ±200 mg polymer was dissolved in 0.8 mL CDCl$_3$ or DMSO-d6 or acetonitrile-d3 or D$_2$O (with or without NaOD addition). Spectra were recorded on a Varian Gemini2000 300 MHz equipped with a SW-probe.

$M_n$, $M_w$, $M_z$ and polydispersity (pd) values were measured using gel permeation chromatography. For polymers dissolvable in organic solvents PL-mixed B columns (Polymer Laboratories Ltd) were used with either THF or THF+5% acetic acid as mobile phase using polystyrene with known molecular weights as calibration standards. These polymers were dissolved in the mobile phase at a concentration of 1 mg/mL. For polymers dissolvable in water PL Aquagel OH-60, OH-50, OH-40 and/or OH-30 (Polymer Laboratories Ltd) column combinations were used depending on the molecular weight region of the polymers under investigation. As mobile phase water/methanol mixtures adjusted to pH 9.2 with, e.g., disodiumhydrogen phosphate were used with or without the addition of neutral salts, e.g., sodium nitrate. As calibration standards polyacrylic acids with known molecular weights were used. The polymers were dissolved in either water or water made basic with ammonium hydroxide at a concentration of 1 mg/mL. Refractive index detection was used.

Some examples are now given to illustrate the calculation of the composition of the (block)copolymers:

Determination of the average composition of a random (=statistical) copolymer P(MAA-c-EHA):

Determine Mn of copolymer with GPC=>Mn=5000

Determine molar percentage of each monomer type by NMR=>45 mol % MAA and 55 mol % EHA $(0.45 \times M_{MAA}) + (0.55 \times M_{EHA}) = 140.09$ $5000/140.09$=total number of monomeric units in average polymer chain=36

Average number of MAA units=$0.45 \times (5000/140.09)$=16 units

Average number of EHA units=$0.55 \times (5000/140.09)$=20 units

Thus, the average composition is P(MAA$_{16}$-c-EHA$_{20}$).

Determination of the average composition of AB block copolymer P(AA-b-BnA):

Block copolymer was prepared via ATRP. First a PtBA macroinitiator was prepared: Mn of this macroinitiator (based on NMR) is 6600 g/mol. Thus, the block length is $6600/M_{tBA}$=51 tBA units. Subsequently, the second block is prepared using BnA. Applying NMR the molar ratio between the two monomer types can be determined: 65/35 (tBA/BnA). Thus, the average composition of the block copolymer is P(tBA$_{51}$-b-BnA$_{27}$). After hydrolysis of the tBA units the final composition of the fully unprotected block copolymer is P(AA$_{51}$-b-BnA$_{27}$).

4. Particle Size

The particle size of pigment particles in a pigment dispersion was determined by photon correlation spectroscopy at a wavelength of 632 nm on a tenfold diluted sample of a pigment dispersion. The particle size analyzer used was a Brookhaven BI90plus available from Brookhaven Instruments Corporation.

Example 1

This example illustrates the synthesis of an AB block copolymer with a polymeric A segment of polymerized sodium 4-styrenesulfonate (SSA-Na) and a polymeric B segment of polymerized sodium 4-vinyl benzoate (VBA-Na). The blockcopolymer is used in Example 2 as dispersant DISP-12.

First, the RAFT-agent, 4-cyanopentanoic acid dithiobenzoate, was synthesized according to the reaction scheme in FIG. 1 and purified. Then, the polymeric A segment of the AB block copolymer, i.e., polymerized sodium 4-styrenesulfonate, was synthesized and subsequently used as starting polymer for the blockcopolymerization with sodium 4-vinyl benzoate.

Synthesis of Dithiobenzoic Acid (DTBA)

To a thoroughly dried 1 L, three-necked round-bottomed flask equipped with a magnetic stir bar, addition funnel (250.0 mL), thermometer, and rubber septum for liquid transfers was added sodium methoxide (30% solution in methanol, 180.0 g). Anhydrous methanol (250.0 g) was added to the flask via cannula, followed by rapid addition of elemental sulfur (32.0 g). Benzyl chloride (63.0 g) was then added dropwise via the addition funnel over a period of one hour at room temperature under a dry nitrogen atmosphere. The reaction mixture was heated in an oil bath at 67° C. for 10 hours. After this time, the reaction mixture was cooled to 7° C. using an ice bath. The precipitated salt was removed by filtration and the solvent removed in vacuo. To the residue was added deionized water (500.0 mL). The solution was filtered a second time and then transferred to a 2 L separatory funnel. The crude sodium dithiobenzoate solution was washed three times with diethyl ether (200.0 mL). Diethylether (200.0 mL) and 1.0 N HCl (500.0 mL) were added, and dithiobenzoic acid was extracted into the ethereal layer. Deionized water (300.0 mL) and 1.0 N NaOH (600.0 mL) were added, and sodium dithiobenzoate was extracted to the aqueous layer. This washing process was repeated to finally yield a solution of sodium dithiobenzoate.

Synthesis of di(thiobenzoyl) Disulfide

Potassium ferricyanide (III) (32.93 g) was dissolved in deionized water (500.0 mL). Sodium dithiobenzoate solution (350.0 mL) was transferred to a 1 L conical flask equipped with a magnetic stir bar. Potassium ferricyanide solution was added dropwise to the sodium dithiobenzoate via an addition funnel over a period of one hour under vigorous stirring. The red precipitate was filtered and washed with deionized water until the washings become colorless. The solid was dried in vacuo at room temperature overnight; the product was recrystallized from ethanol.

Synthesis of 4-cyanopentanoic Acid Dithiobenzoate

To a 250 mL round-bottomed flask was added distilled ethylacetate (80.0 mL). To the flask was added dry 4,4'-azobis (4-cyanopentanoic acid) (5.84 g) and Di(thiobenzoyl) disulfide (4.25 g). The reaction solution was heated at reflux for 18 hours. The ethylacetate was removed in vacuo. The crude product was isolated by column chromatography (Silicagel 60 Å, 70-230 mesh) using ethyl acetate-hexane (2:3) as eluent. Fractions that were red in color were combined and dried over anhydrous sodium sulphate overnight. The solvent mixture was removed in vacuo, and the red oily residue placed in a freezer at −20° C., whereupon it crystallized. 4-cyanopentanoic acid dithiobenzoate was recrystallized from benzene.

Purification of 4-cyanopentanoic Acid Dithiobenzoate

The RAFT agent 4-cyanopentanoic acid dithiobenzoate was analyzed with $^1$H-NMR and was found to be contaminated with different kinds of impurities (e.g., benzyl chloride). The purification of 4-cyanopentanoic acid dithiobenzoate was carried out using a HPLC column, Prochrom LC80 (l=25 cm, d=8 cm) filled with Kromasil Si 60 Å 10 mic. A solution was made of 4-cyanopentanoic acid dithiobenzoate in a mixture of ethylacetate and n-hexane (1:2.33). From the chromatogram it was obvious, that only the main peak after 14-17 minutes represented the desired product, 4-Cyanopentanoic acid dithiobenzoate and was therefore separated from the rest of the solution. After evaporating most of the solvent, a bit of hexane added. In the refrigerator the product crystallized overnight. The crystals are dried in the vacuum oven. The vessel with the RAFT agent inside was densely closed and stored in the refrigerator in order to prevent hydrolysis.

Synthesis of poly(sodium 4-styrenesulfonate) Macro-initiator

To a 100 mL round-bottomed flask equipped with a magnetic stir bar was added sodium 4-styrenesulfonate (6.0 g), 4-cyanopentanoic acid dithiobenzoate (0.2 mmol), AIBN-COOH (0.04 mmol) and water (27 g). The reaction mixture was heated in an oil bath at 72° C. for 2 hours. The polymerization was terminated by rapid cooling. A sample was taken and analyzed: Mn was 7977, pd=2.1 and DP=39.

Synthesis of the AB Block Copolymer

To a 100 mL round-bottomed flask equipped with a magnetic stir bar was added poly(sodium 4-styrenesulfonate) macro-initiator (0.50 g), 4-vinylbenzoic acid (0.36 g), 4,4'-azobis(4-cyanopentanoic acid) (4 mg) and water (5 g). Sodium hydroxide (6.0 M) was added to solubilize the 4-vinylbenzoic acid. The mixture was deoxygenated by purging with nitrogen for 20 minutes. The flask was heated in a water bath at 70° C. The polymerization was allowed to proceed for 6 hours and then the reaction mixture was dialyzed with water, followed by freeze-drying.

The obtained block copolymer was BCP-8 of Table 1 with x and y equal to 39.

Example 2

This example illustrates the advantages of the blockcopolymers according to preferred embodiments of the present invention used as dispersants in pigment dispersions of pigments with at least one carboxylic acid group.

The dispersants DISP-1 to DISP-12 according to Table 2, wherein x, y, and z represent the number of monomers in the block copolymers BCP-1 to BCP-8 of Table 1, were used to disperse the pigments DYE-1 and DYE-2.

TABLE 2

| Dispersant | Blockcopolymer | x | y | z |
|---|---|---|---|---|
| DISP-1 | BCP-1 | 19 | 44 | — |
| DISP-2 | BCP-1 | 19 | 73 | — |
| DISP-3 | BCP-1 | 19 | 31 | — |
| DISP-4 | BCP-2 | 21 | 19 | 21 |
| DISP-5 | BCP-3 | 19 | 44 | — |
| DISP-6 | BCP-3 | 19 | 73 | — |
| DISP-7 | BCP-4 | 118 | 17 | — |
| DISP-8 | BCP-5 | 49 | 142 | — |
| DISP-9 | BCP-5 | 49 | 101 | — |
| DISP-10 | BCP-6 | 21 | 37 | 21 |
| DISP-11 | BCP-7 | 48 | 30 | 48 |
| DISP-12 | BCP-8 | 39 | 39 | — |

Preparation of the Pigment Dispersion

All the pigment dispersions were prepared in the same manner as described here below.

To a 100 mL round-bottomed flask equipped with a magnetic stir bar was added the pigment (1.0 g), ARLO (0.25 g), the dispersant (0.5 g) and water (35.0 g). The mixture was stirred until the dispersant was dissolved. Sodium hydroxide (3N) was added until the pH reached 9.5. The mixture was stirred for an additional 10 minutes. Sulfuric acid (6N) was added quickly until the pH reached 3.5. Adjust the pH with sodium hydroxide to 4.5. Stir for 10 minutes. Add water to have a total weight of 50.0 g.

Using the above method, the comparative pigment dispersions COMP-1 to COMP-22 and the inventive pigment dispersions INV-1 and INV-2 were prepared according to Table 3.

TABLE 3

| Pigment dispersion | Pigment | Dispersant |
|---|---|---|
| COMP-1 | DYE-1 | DISP-1 |
| COMP-2 | DYE-1 | DISP-2 |
| COMP-3 | DYE-1 | DISP-3 |
| COMP-4 | DYE-1 | DISP-4 |
| COMP-5 | DYE-1 | DISP-5 |
| COMP-6 | DYE-1 | DISP-6 |
| COMP-7 | DYE-1 | DISP-7 |
| COMP-8 | DYE-1 | DISP-8 |
| COMP-9 | DYE-1 | DISP-9 |
| COMP-10 | DYE-1 | DISP-10 |
| COMP-11 | DYE-1 | DISP-11 |
| COMP-12 | DYE-2 | DISP-1 |
| COMP-13 | DYE-2 | DISP-2 |
| COMP-14 | DYE-2 | DISP-3 |
| COMP-15 | DYE-2 | DISP-4 |
| COMP-16 | DYE-2 | DISP-5 |
| COMP-17 | DYE-2 | DISP-6 |
| COMP-18 | DYE-2 | DISP-7 |
| COMP-19 | DYE-2 | DISP-8 |
| COMP-20 | DYE-2 | DISP-9 |
| COMP-21 | DYE-2 | DISP-10 |
| COMP-22 | DYE-2 | DISP-11 |
| INV-1 | DYE-1 | DISP-12 |
| INV-2 | DYE-2 | DISP-12 |

Coating of the Colored Layer

A 5% solution of gelatin was prepared by mixing KPF16353 gelatin at 40° C. for 1 hour. The pigment dispersion (4.00 g) and ARLO (0.89 g) were added to the 5% solution of gelatin (15.11 g) in order to complete a coating solution. The coating solution was stirred for 20 minutes at 40° C. and then applied to a transparent 150 μm subbed PET as the support by means of a doctor blade, providing a wet layer thickness of 50 μm. The coated sample was left to dry for 2 hours at 20° C.

Using the coating method described above, the comparative pigment dispersions COMP-1 to COMP-22 and the inventive pigment dispersions INV-1 and INV-2 were coated on a transparent 150 μm subbed PET. For testing the dispersion stability, the comparative pigment dispersions COMP-1 to COMP-22 and the inventive pigment dispersions INV-1 and INV-2 were subjected to a heat treatment (4 hours at 60° C.) and then coated using the method described above. The spectral separation factor was determined for each of the coated samples. The results are shown in Table 4.

TABLE 4

| Coated layer of pigment dispersion | SSF | SSF after 4 h/60° C. | % Reduction in SSF |
|---|---|---|---|
| COMP-1 | 2.3 | 5.7 | 0% |
| COMP-2 | 7.2 | 5.4 | 25% |
| COMP-3 | 11.0 | 6.6 | 40% |
| COMP-4 | 9.1 | 7.6 | 16% |
| COMP-5 | 121.3 | 5.5 | 95% |
| COMP-6 | 13.1 | 7.1 | 46% |
| COMP-7 | 60.2 | 11.3 | 81% |
| COMP-8 | 6.3 | 5.5 | 13% |
| COMP-9 | 5.5 | 5.3 | 4% |
| COMP-10 | 4.9 | 7.3 | 0% |
| COMP-11 | 4.9 | 3.0 | 39% |
| COMP-12 | 76.3 | 3.7 | 95% |
| COMP-13 | 34.4 | 1.9 | 94% |
| COMP-14 | 111.9 | 5.7 | 95% |
| COMP-15 | 273.7 | 44.8 | 84% |
| COMP-16 | 30.8 | 28.4 | 8% |
| COMP-17 | 4.1 | 6.0 | 0% |
| COMP-18 | 61.0 | 2.5 | 96% |
| COMP-19 | 30.3 | 2.2 | 93% |
| COMP-20 | 28.6 | 5.3 | 81% |
| COMP-21 | 13.1 | 13.8 | 0% |
| COMP-22 | 5.2 | 15.1 | 0% |
| INV-1 | 58.6 | 89.7 | 0% |
| INV-2 | 114.5 | 132.4 | 0% |

From Table 4, it is clear that only the coated layers of the inventive samples INV-1 and INV-2 demonstrate a high SSF both before and after heat treatment and without any reduction in the SSF.

Example 3

This example illustrates the advantages of a blockcopolymer according to preferred embodiments of the present invention compared to homopolymers and statistical copolymers of the same monomers.

The following dispersants, having on average the same number of monomers as the dispersant DISP-12, were used:
DISP-13 is a homopolymer of SSA
DISP-14 is a homopolymer of VBA
DISP-15 is a statistic copolymer of SSA and VBA The comparative pigment dispersions COMP-23 to COMP-30 were prepared in exactly the same manner as described in Example 2 but using the dyes and dispersants according to Table 5. For the comparative pigment dispersions COMP-25 and COMP-29 a mixture of the dispersants DISP-13 and DISP-14 was used.

TABLE 5

| Pigment dispersion | Pigment | Dispersant |
|---|---|---|
| COMP-23 | DYE-1 | DISP-13 |
| COMP-24 | DYE-1 | DISP-14 |
| COMP-25 | DYE-1 | 50% DISP-13 + 50% DISP-14 |
| COMP-26 | DYE-1 | DISP-15 |
| COMP-27 | DYE-2 | DISP-13 |
| COMP-28 | DYE-2 | DISP-14 |
| COMP-29 | DYE-2 | 50% DISP-13 + 50% DISP-14 |
| COMP-30 | DYE-2 | DISP-15 |
| INV-1 | DYE-1 | DISP-12 |
| INV-2 | DYE-2 | DISP-12 |

The comparative pigment dispersions COMP-23 to COMP-30 were coated in the same manner as the inventive pigment dispersions INV-1 and INV-2 in Example 2. For testing the dispersion stability, the comparative pigment dispersions COMP-23 to COMP-30 were subjected to the same heat treatment (4 hours at 60° C.) as the inventive pigment dispersions INV-1 and INV-2 and then coated in the same manner. The spectral separation factor was determined for each of the coated samples. The results are shown in Table 6.

TABLE 6

| Coated layer of pigment dispersion | SSF | SSF after 4 h/60° C. | % Reduction in SSF |
|---|---|---|---|
| COMP-23 | 4.5 | 10.5 | 0% |
| COMP-24 | 1.6 | 4.3 | 0% |
| COMP-25 | 1.5 | 3.8 | 0% |
| COMP-26 | 7.0 | 5.2 | 26% |
| COMP-27 | 23.9 | 2.7 | 89% |
| COMP-28 | 2.1 | — | 100% |
| COMP-29 | 24.6 | 1.9 | 92% |
| COMP-30 | 224.0 | 56.5 | 75% |
| INV-1 | 58.6 | 89.7 | 0% |
| INV-2 | 114.5 | 132.4 | 0% |

The SSF after heat treatment for the comparative pigment dispersion COMP-28 was too low and could not be measured. It is clear from Table 6 that the comparative pigment dispersions COMP-23 to COMP-30, with a homopolymer, a mixture of the homopolymers or a statistical copolymer consisting of the same monomers as the blockcopolymer used in the inventive samples INV-1 and INV-2, did not result in coated layers with a high SSF both before and after heat treatment and/or without much % reduction in the SSF.

Example 4

In this example the influence of the number of monomers for the blockcopolymer BCP-8 is investigated.

The comparative pigment dispersion COMP-31 and the inventive pigment dispersions INV-3 to INV-16 were prepared in exactly the same manner as described in Example 2 but using the dye DYE-1 and the dispersants according to Table 7. The dispersants correspond with blockcopolymer BCP-8 wherein x and y represent the number of monomers SSA-Na respectively VBA.

TABLE 7

| Pigment dispersion | Blockcopolymer BCP-8 | |
|---|---|---|
| | x | y |
| INV-3 | 339 | 60 |
| INV-4 | 339 | 30 |
| INV-5 | 109 | 139 |
| INV-6 | 109 | 133 |
| INV-7 | 101 | 114 |
| INV-8 | 101 | 67 |
| INV-9 | 63 | 31 |
| INV-10 | 63 | 21 |
| INV-11 | 63 | 11 |
| INV-12 | 8 | 70 |
| INV-13 | 8 | 56 |
| INV-14 | 8 | 42 |
| INV-15 | 13 | 48 |
| INV-16 | 13 | 36 |
| COMP-31 | 13 | 12 |

The comparative pigment dispersion COMP-31 and the inventive pigment dispersions INV-3 to INV-16 were coated in the same manner as in Example 2. For testing the dispersion stability, the comparative pigment dispersion COMP-31 and the inventive pigment dispersions INV-3 to INV-16 were subjected to the same heat treatment (4 hours at 60° C.) and then coated in the same manner. The spectral separation factor was determined for each of the coated samples. The results are shown in Table 8.

TABLE 8

| Coated layer of pigment dispersion | SSF | SSF after 4 h/60° C. | % Reduction in SSF |
|---|---|---|---|
| INV-3 | 149.3 | 470.2 | 0% |
| INV-4 | 69.5 | 50.1 | 28% |
| INV-5 | 17.6 | 51.3 | 0% |
| INV-6 | 39.1 | 57.5 | 0% |
| INV-7 | 18.2 | 52.5 | 0% |
| INV-8 | 41.4 | 109.4 | 0% |
| INV-9 | 70.6 | 55.9 | 21% |
| INV-10 | 190.3 | 61.9 | 67% |
| INV-11 | 59.3 | 96.1 | 0% |
| INV-12 | 147.8 | 70.6 | 52% |
| INV-13 | 64.9 | 42.1 | 35% |
| INV-14 | 93.3 | 82.8 | 11% |
| INV-15 | 73.8 | 39.0 | 47% |
| INV-16 | 59.0 | 48.4 | 18% |
| COMP-31 | 1.7 | 8.9 | 0% |

Table 8 shows that the comparative pigment dispersion COMP-31 using a blockcopolymer with less than 25 monomers did not result in a coated layer with a high SSF before or after heat treatment for the dye DYE-1. It was also noticed that the inventive pigment dispersions INV-5 and INV-7 required a heat treatment to obtain coated layers with a SSF greater than 30.0.

The particle size was determined for a number of pigment dispersions. Table 9 shows the results.

TABLE 9

| Pigment dispersion | Particle size (nm) |
|---|---|
| INV-3 | 298 |
| INV-7 | 199 |
| INV-8 | 189 |
| INV-11 | 173 |
| INV-12 | 197 |
| COMP-31 | 306 |

From Table 9, it is clear that a too small blockcopolymeric dispersant leads to a larger particle size of about 300 nm. A similar particle size is obtained in the inventive pigment dispersion INV-3 using a very large blockcopolymeric dispersant.

Having described in detail preferred embodiments of the present invention, it will now be apparent to those skilled in the art that numerous modifications can be made therein without departing from the scope of the invention as defined in the following claims.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A pigment dispersion comprising:
   a pigment with at least one carboxylic acid group; and
   a block copolymer; wherein monomeric units of the block copolymer consist of:

aromatic monomeric units A having at least one carboxylic acid group or a salt thereof; and
aromatic monomeric units B having at least one sulfonic acid group or a salt thereof.

2. The pigment dispersion according to claim 1, wherein said block copolymer includes at least 25 monomeric units.

3. The pigment dispersion according to claim 1, wherein the aromatic monomeric units A include at least one carboxylic acid group or a salt thereof and the aromatic monomeric units B include at least one sulfonic acid group or a salt thereof are represented by Formula (I):

Formula (I)

wherein,
m=0 or 1;
n is 1 or an integer value greater than 1;
R represents hydrogen or methyl;
L represents a linking group containing at least one atom selected from the group consisting of C, O, and S;
Ar represents an aromatic group or a heteroaromatic group;
X is selected from the group consisting of COOH, COO$^-$M$^+$, SO$_3$H, and SO$_3$$^-$M$^+$; and
M$^+$ represents a cation.

4. The pigment dispersion according to claim 3, wherein m=1 and the linking group L is represented by —(C=O)—O—.

5. An inkjet ink comprising the pigment dispersion according to claim 4.

6. The inkjet ink according to claim 5, wherein the inkjet ink is a radiation curable inkjet ink.

7. The pigment dispersion according to claim 3, wherein M$^{30}$ is selected from the group consisting of Na$^+$, Li$^+$, K$^+$, NH$_4$$^+$, and quaternary amine.

8. An inkjet ink comprising the pigment dispersion according to claim 7.

9. The pigment dispersion according to claim 3, wherein the aromatic monomeric unit A including at least one carboxylic acid group or a salt thereof is vinyl benzoic acid or a salt thereof.

10. An inkjet ink comprising the pigment dispersion according to claim 9.

11. The inkjet ink according to claim 10, wherein the inkjet ink is a radiation curable inkjet ink.

12. The pigment dispersion according to claim 3, wherein the aromatic monomeric unit B including at least one sulfonic acid group or a salt thereof is styrenesulfonic acid or a salt thereof.

13. The pigment dispersion according to claim 12, wherein the styrenesulfonic acid or a salt thereof is selected from the group consisting of 4-styrenesulfonic acid, sodium 4-styrenesulfonate, potassium 4-styrenesulfonate, and ammonium 4-styrenesulfonate.

14. An inkjet ink comprising the pigment dispersion according to claim 12.

15. The inkjet ink according to claim 14, wherein the inkjet ink is a radiation curable inkjet ink.

16. An inkjet ink comprising the pigment dispersion according to claim 1.

17. The inkjet ink according to claim 16, wherein the inkjet ink is a radiation curable inkjet ink.

18. A colored layer coated from a coating solution comprising the pigment dispersion according to claim 1.

19. A process for preparing a pigment dispersion as defined by claim 1, comprising the steps of:
a) synthesizing a block copolymer consisting of aromatic monomeric units A and aromatic monomeric units B by reversible addition fragmentation chain transfer polymerization performed in an aqueous medium with a water-soluble reversible addition fragmentation chain transfer polymerization agent; and
b) dispersing at least one pigment with the synthesized block copolymer; wherein the aromatic monomeric units A have at least one carboxylic acid group or a salt thereof;
the aromatic monomeric units B have at least on sulfonic acid group or a salt thereof; and
the pigment is a pigment with at least one carboxylic acid group.

20. The process for preparing the pigment dispersion according to claim 19, wherein the water-soluble reversible addition fragmentation chain transfer polymerization agent is 4-cyanopentanoic acid dithiobenzoate.

21. The process for preparing the pigment dispersion according to claim 20, wherein the pigment dispersion is prepared by precipitation.

* * * * *